(12) United States Patent
Nishimura et al.

(10) Patent No.: US 11,085,783 B2
(45) Date of Patent: Aug. 10, 2021

(54) SUPPLEMENTING LEARNING DATA TO DETERMINE MOST PROBABLE PATH

(71) Applicant: INTERNATIONAL BUSINESS MACHINES CORPORATION, Armonk, NY (US)

(72) Inventors: Yasutaka Nishimura, Yamato (JP); Shoichiro Watanabe, Tokyo (JP); Sanehiro Furuichi, Tokyo (JP); Kenichi Takasaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/379,766

(22) Filed: Apr. 9, 2019

(65) Prior Publication Data

US 2020/0326198 A1  Oct. 15, 2020

(51) Int. Cl.
*G01C 21/34* (2006.01)

(52) U.S. Cl.
CPC ..... *G01C 21/3484* (2013.01); *G01C 21/3415* (2013.01)

(58) Field of Classification Search
CPC .............. G01C 21/3484; G01C 21/3415
See application file for complete search history.

(56) References Cited

U.S. PATENT DOCUMENTS

| | | | |
|---|---|---|---|
| 9,409,570 B2 | 8/2016 | Pandita et al. | |
| 2003/0135304 A1* | 7/2003 | Sroub | G06Q 10/08 701/1 |
| 2011/0208429 A1* | 8/2011 | Zheng | G01C 21/3484 701/533 |
| 2013/0173150 A1* | 7/2013 | Ghisio | G01C 21/3453 701/423 |
| 2018/0052005 A1 | 2/2018 | Schilling et al. | |
| 2018/0217600 A1 | 8/2018 | Shashua et al. | |
| 2020/0042012 A1* | 2/2020 | Zander | G01C 21/36 |

OTHER PUBLICATIONS

IBM, "Driver Behavior," IBM IoT Connected Vehicle Insights, p. 1-4, https://www.ibm.com/support/knowledgecenter/en/SSNQ4V_bas/iot-automotive/managing/driver_behavior/db_intro.html, Accessed on Apr. 8, 2019.

Mell et al., "The NIST Definition of Cloud Computing," National Institute of Standards and Technology, Sep. 2011, p. 1-3, Special Publication 800-145.

* cited by examiner

*Primary Examiner* — Anne Marie Antonucci
*Assistant Examiner* — Sahar Motazedi
(74) *Attorney, Agent, or Firm* — L. Jeffrey Kelly

(57) ABSTRACT

A method, computer system, and a computer program product for supplementing learning data to determine a Most Probable Path (MPP) for a user driver is provided. The present invention may include determining a change associated with a set of map data. The present invention may then include extracting a set of trajectory data in response to the determined change associated with the set of map data. The present invention may also include performing a rerouting calculation for the extracted set of trajectory data, wherein the performed rerouting calculation generates a rerouting result, wherein the generated rerouting result is added to a set of learning data in a learning data database. The present invention may further include adding one or more trajectory patterns to the learning data based on an increase frequency after the determined change associated with the set of map data.

20 Claims, 7 Drawing Sheets

SUPPLEMENTING LEARNING DATA TO DETERMINE MOST PROBABLE PATH

BACKGROUND

The present invention relates generally to the field of computing, and more particularly to Most Probable Path (MPP) determination.

Recently, a plethora of advanced trajectory analysis technologies have included increasing demands for advanced driver-assistance systems (ADAS) and self-driving technologies. One of such technologies is the Most Probable Path (MPP), which is utilized for calculating a trajectory most probably followed by a vehicle from the current driving trajectory and past statistics.

SUMMARY

Embodiments of the present invention disclose a method, computer system, and a computer program product for supplementing learning data to determine a Most Probable Path (MPP) for a user driver. The present invention may include determining a change associated with a set of map data. The present invention may then include extracting a set of trajectory data in response to the determined change associated with the set of map data. The present invention may also include performing a rerouting calculation for the extracted set of trajectory data, wherein the performed rerouting calculation generates a rerouting result, wherein the generated rerouting result is added to a set of learning data in a learning data database. The present invention may further include adding one or more trajectory patterns to the learning data based on an increase frequency after the determined change associated with the set of map data, wherein the added one or more trajectory patterns includes a final set of route patterns, wherein the final set of route patterns include the MPP for the user driver.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
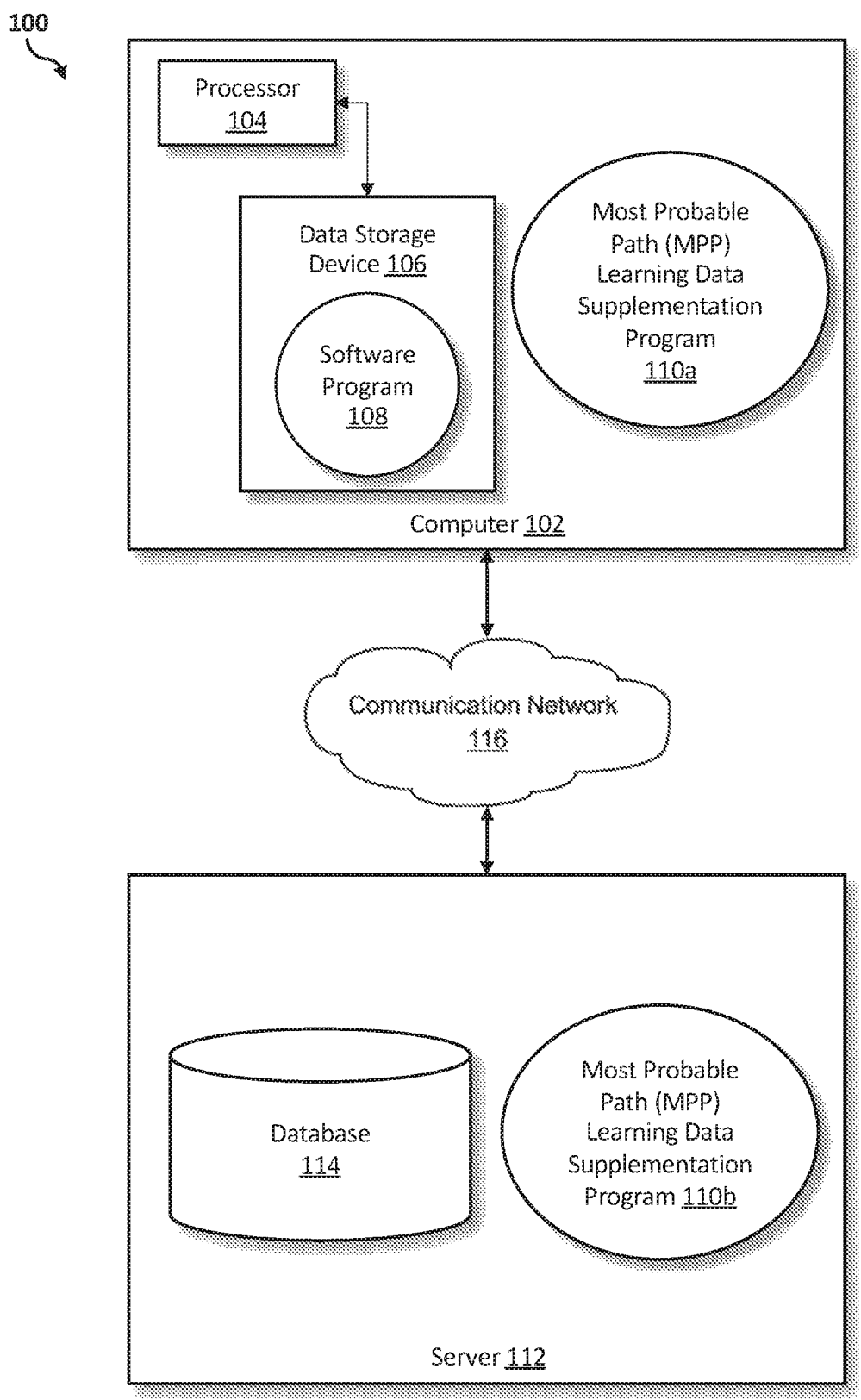
FIG. 1 illustrates a networked computer environment according to at least one embodiment.

The following described exemplary embodiments provide a system, method and program product for determining the Most Probable Path (MPP) by supplemental learning data. As such, the present embodiment has the capacity to improve the technical field of MPP determination by extracting trajectory data in response to a change in the map data. More specifically, the Most Probable Path (MPP) learning data supplementation program may extract an added or deleted road, and may extract a trajectory passing through or near a changed road. The MPP learning data supplementation program may perform a rerouting calculation for the extracted trajectory data and add the rerouting result to the learning data. The MPP learning data supplementation program may then add a trajectory pattern to the learning data based on a significantly increased route frequency after the change.

As previously described, a plethora of advanced trajectory analysis technologies have recently included increasing demands for advanced driver-assistance systems (ADAS) and self-driving technologies. One of such technologies is the Most Probable Path (MPP), which is utilized for calculating a trajectory most probably followed by a vehicle from the current driving trajectory and past statistics.

As for learning data in trajectory pattern mining or MPP calculation, only the latest data in units of three months or one year has been used to keep freshness. However, simply dividing the period leads to difficulty in providing finer MPP due to the inability to capture trajectory patterns caused by changes in the version of a map (e.g., newly constructed highway) or road event (e.g., construction), or little trajectory data corresponding to the updated map version.

Therefore, it may be advantageous to, among other things, add and select learning data from past and future data set(s) when a map event has occurred, and further to perform rerouting calculations with new trajectory data on an updated (i.e., current) map, calculate the rerouting result to learning data, and add trajectory patterns to learning data based on an increase in frequency from the rerouting results.

According to at least one embodiment, the MPP learning data supplementation program may compensate for a deficiency in the learning data for the MPP calculation, when map change events (e.g., update maps, road events, road conditions) occur. The present embodiment may include a classification of the trajectory data based on an extraction of a changed (e.g., added or deleted) road, and an extraction of a trajectory passing through or near the changed road.

According to at least one embodiment, the MPP learning data supplementation program may start from a changed road link. The MPP learning data supplementation program may perform searches for the trajectory to narrow down an extent of influence of changing roads. The present embodiment may include following the links from the changed road in the opposite direction of the destination, when a link is deleted or changed. When there is one or more shortest routes along which a vehicle may reach a link to the traveling direction of the trajectory without making a U-turn, or circulation, the MPP learning data supplementation program may set this point as a virtual Origin (Ov). In the present embodiment, the MPP learning data supplementation program may set a link connected to the origin of the trajectory in the shortest distance from the newly provided link as the Ov, when a link is newly provided. In the present embodiment, the MPP learning data supplementation program may also set a link that allows return to the original trajectories to the direction of the destination as a virtual Destination (Dv).

According to at least one embodiment, the MPP learning data supplementation program may extract trajectories including a Ov/Dv and may then classify the Ov/Dv by the drivers. In the case where the road on the trajectory is deleted, if a rerouting result of the trajectory is unique, the MPP learning data supplementation program may convert the rerouting result into a rerouted learning data. However, in the case where the road on the trajectory is deleted or changed (e.g., lane was narrowed and the like), if additional drivers including in the same trajectory pattern follow the same route in the latter version and the trajectory pattern significantly increased in the latter version as compared to the former version, the MPP learning data supplementation program may add the latter trajectory pattern to the learning data.

According to at least one embodiment, the MPP learning data supplementation program may retain the previous trajectory patterns and may perform a different process according to types of events, when the trajectory pattern after relearning with the latest data is changed. In the present embodiment, the MPP learning data supplementation program may calculate the Ov/Dv based on the road link in which the road event occurs. The MPP learning data supplementation program may refer to data of additional drivers having passed through the Ov/Dv in the past and having similar preferences, and add them to the learning data, when there exists no sufficient trajectory data of the occurred event. When the event (e.g., construction, accident investigation) has an end time, the MPP learning data supplementation program may weigh the increased probability of the former trajectory pattern after the end time. When the start time of the event is known beforehand, the MPP learning data supplementation program may perform weighting to give priority to a route that will be changed from the past history after the event starts.

According to at least one embodiment, the MPP learning data supplementation program may tabulate the routes for each Ov/Dv and may calculate the frequency for each route.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a MPP learning data supplementation program 110a. The networked computer environment 100 may also include a server 112 that is enabled to run a MPP learning data supplementation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the MPP learning data supplementation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the MPP learning data supplementation program 110a, 110b (respectively) to supplement learning data for Most Probable Path (MPP) by calculating a trajectory most probably followed by a vehicle from the current driving trajectory and past statistics. The MPP learning data supplementation method is explained in more detail below with respect to FIGS. 2A, 2B and 2C.

Figure 2A:
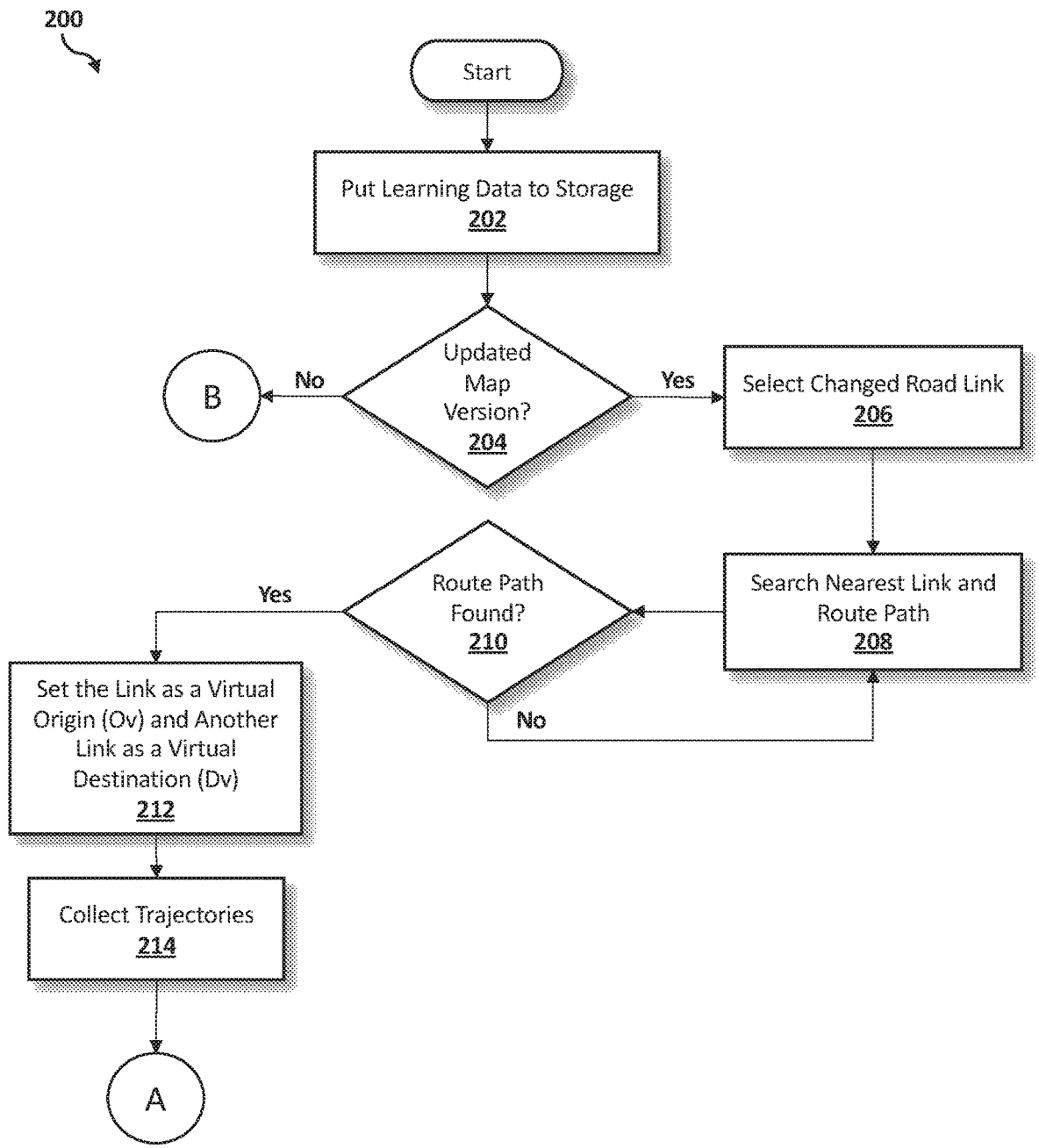
FIGS. 2A-2C are operational flowcharts illustrating a process for supplementing learning data process 200 according to at least one embodiment.
Figure 2B:
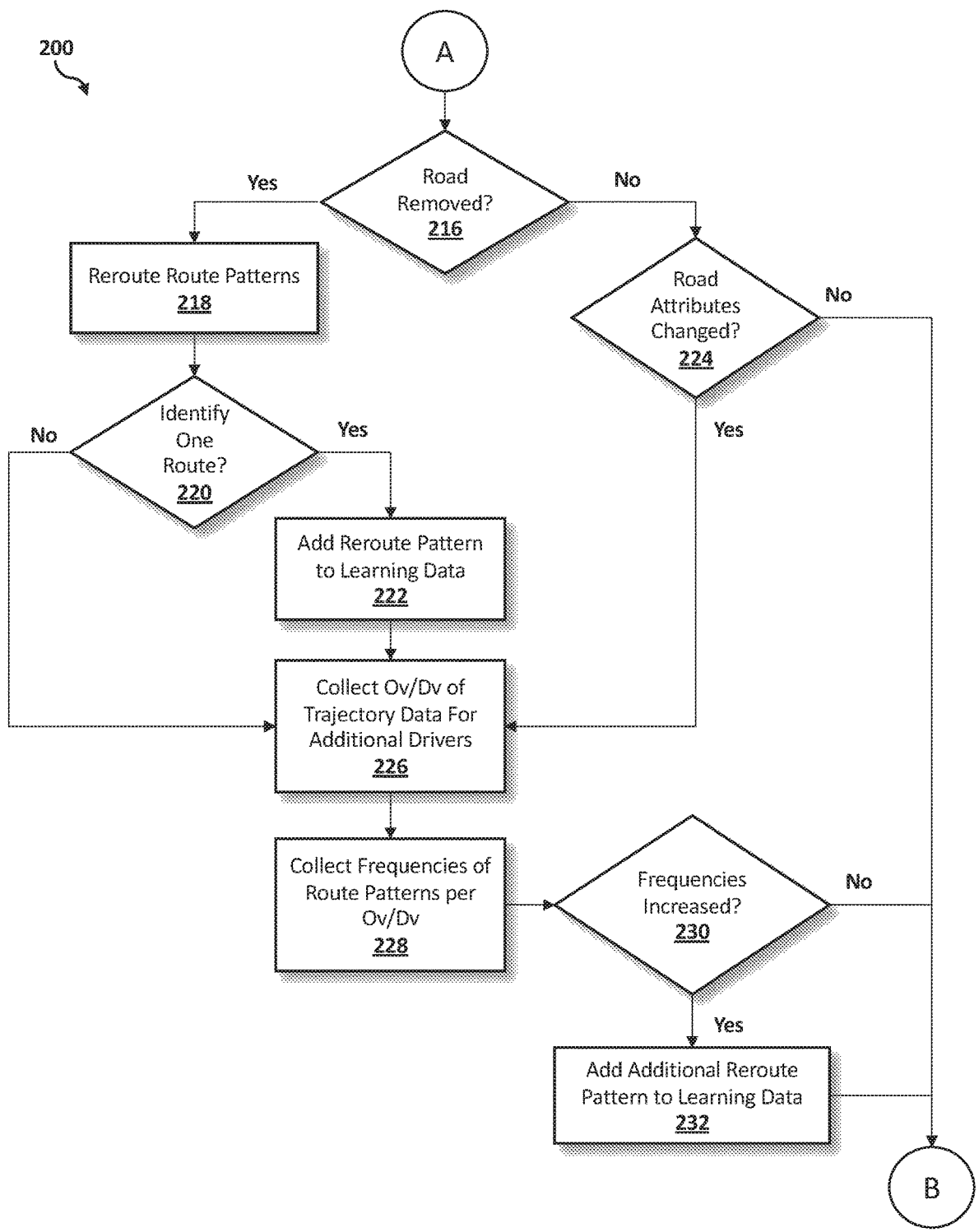
Figure 2C:
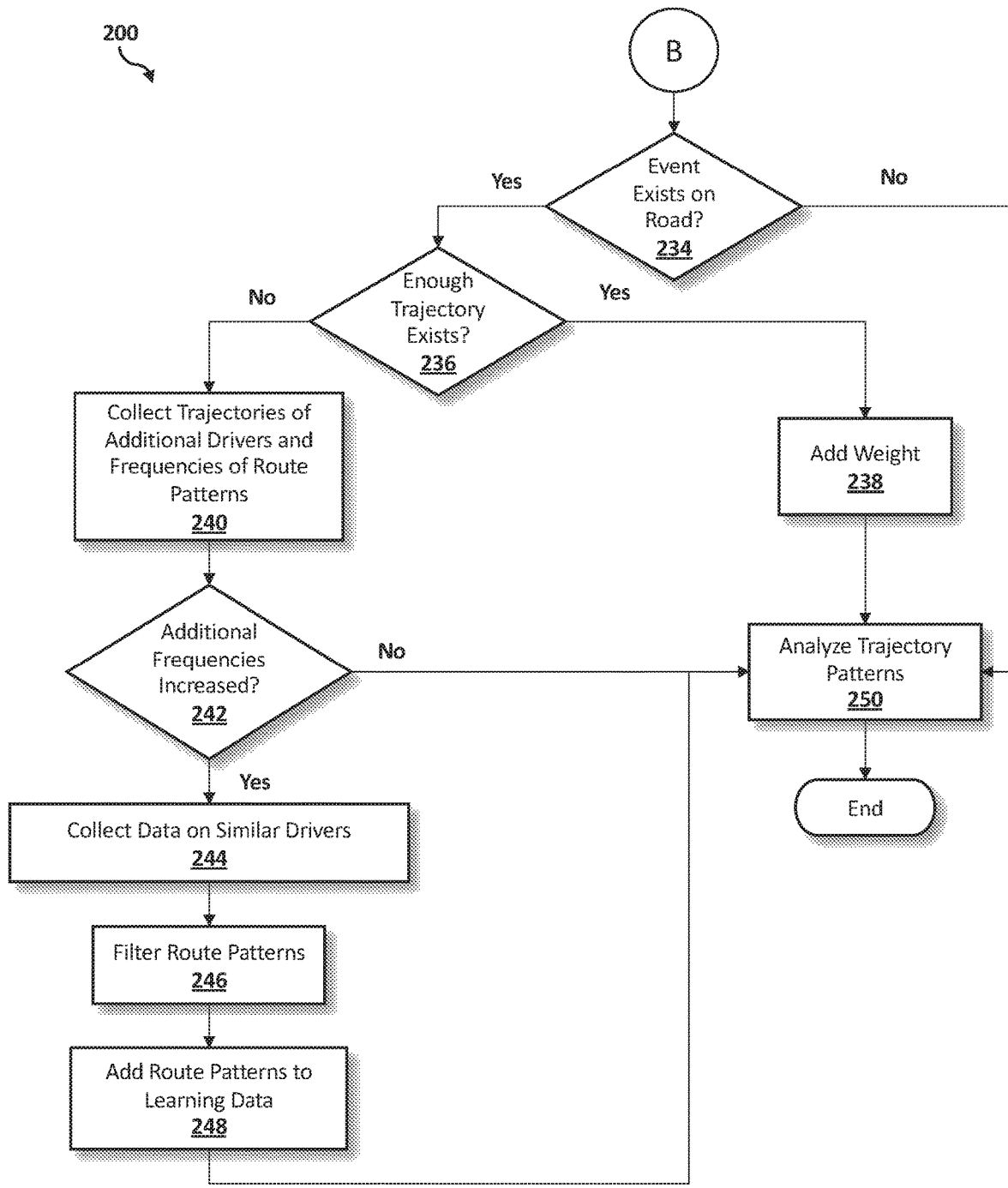

Referring now to FIGS. 2A-2C, operational flowcharts illustrating the exemplary learning data supplementation process 200 used by the MPP learning data supplementation program 110a, 110b according to at least one embodiment is depicted.

At 202, learning data is put into storage. Utilizing a software program 108 on the user's device (e.g., user's computer 102), learning data may be transmitted as input into the data storage device 106 associated with the MPP learning data supplementation program 110a, 110b (e.g., repository or database 114) via the communication network 116. Learning data may include the latest or most recent data sets associated with the updated or latest maps (i.e., within a default period of time of less than one year) to preserve the freshness of the learning data. The learning data may be utilized by the MPP learning data supplementation program 110a, 110b to train a machine learning (ML) model to determine the Most Probable Path (MPP).

In at least one embodiment, the user driver and/or an administrator may re-configure the settings to change the default period of time associated with the latest or most recent data sets.

For example, User Driver A periodically utilizes the MPP learning data supplementation program 110a, 110b when stuck in traffic while travelling from work in Manhattan, NYC. As such, the MPP learning data supplementation program 110a, 110b has gathered a large quantity of data on the user driver's traffic patterns. Since User Driver A is in a rush to attend a Parent Teacher Conference at the school of User Driver A's youngest child, Child A, by 6:15 pm, User Driver A activates the MPP learning data supplementation program 110a, 110b from User Driver A's smart phone at approximately 5:07 pm. User Driver A has been stuck in traffic on Main Street for two minutes.

Next, at 204, the MPP learning data supplementation program 110a, 110b determines if the map version is updated. The MPP learning data supplementation program 110a, 110b may utilize a map version determination module to search a map database (e.g., database 114) and retrieve, via the communication network 116, a current map (i.e., updated map, new map version, new map, or update map version). The map version determination module may then compare the current map retrieved from the map database with previously used map (i.e., old map or previous map) to determine whether the map version has been updated.

If the MPP learning data supplementation program 110a, 110b determines that the map version has not been updated at 204, then the MPP learning data supplementation program 110a, 110b determines whether an event exists on any road included in one or more route patterns identified (i.e., previous set of route pattern(s)) at 234.

Continuing the previous example, if the map version determination module determines that the map has not been updated since the last time that User Driver A utilized the MPP learning data supplementation program 110a, 110b, then the MPP learning data supplementation program 110a, 110b would proceed to determine if an event exists on Main Street.

If, however, the MPP learning data supplementation program 110a, 110b determines that the map version has been updated at 204, then the changed road link is selected at 206. After the current map and the previously used map are compared, the MPP learning data supplementation program 110a, 110b may indicate the differences between the two maps (e.g., highlighting the different road links, bolding the different road links) on the current map. The MPP learning data supplementation program 110a, 110b may automatically select the changed road link and may then classify the trajectory data by either extracting the changed (e.g., added or deleted) road, or extracting the trajectory passing through or near the changed road.

In at least one embodiment, the MPP learning data supplementation program 110a, 110b may superimpose the two maps, and lighten any roads links or patterns that no longer exist in the current map.

Continuing the previous example, the map version determination module determines that the map has been updated since the last time that User Driver A used the MPP learning data supplementation program 110a, 110b. Therefore, the MPP learning data supplementation program 110a, 110b further utilizes the map version determination module to compare the updated map with the previously used map, and then determines that several roads, namely First Street, Second Street and Fifth Street, that intersect with and/or are parallel to Main Street are now one-way roads, instead of two-way roads.

Then, at 208, the nearest link and route pattern are searched. Each route pattern may include a set of links (e.g., L1, L2, L3) and each link may include a corresponding link identification (link ID) in the map database. When the MPP learning data supplementation program 110a, 110b utilizes the map version determination module to compare the previously used map version and the current map version, the map version determination module may extract the differentiation between the link IDs. As such, when the link ID in the route pattern is removed in the current map version, the MPP learning data supplementation program 110a, 110b may determine an extent of influence associated with the changed road(s) and may further perform searches in the map database for the trajectory to narrow down the extent of influence of the changed road(s) by finding the nearest link and route pattern. By determining the extent of influence, the map version determination module may determine whether the changed road will affect the traffic patterns on the route or the nearest link.

Continuing the previous example, the map version determination module then finds three different links associated with First Street, Second Street and Fifth Street, and each of the three different links include a corresponding link ID, namely L1, L2 and L5. After performing a comparison between the previous map version and the current map version, the map version determination module determines that L1 and L5 affect the traffic patterns for Main Street (First and Fifth Street, respectively) since First Street is a main secondary road that intersects with Main Street and connects different highly traveled commercial regions to Main Street. Additionally, Fifth Street parallels Main Street and is utilized to bypass traffic on Main Street, and Main Street has been used to bypass traffic on Fifth Street. By changing Fifth Street to a one-way street, there is more congestion on Fifth Street in the one direction of traffic, and the additional flow of traffic on Main Street has exponentially worsened the travel conditions on Fifth Street. Therefore, the User Driver A will have to travel an additional 10 miles in order to bypass the traffic on Main Street due to the changes in First and Fifth Streets.

Then, at 210, the MPP learning data supplementation program 110a, 110b determines if a route path is found. The MPP learning data supplementation program 110a, 110b may retrieve, as input, the search results (e.g., a determination that the route path is found or that the route path is not found) via the communications network 116 from the map version determination module. In at least one embodiment, the MPP learning data supplementation program 110a, 110b may retrieve multiple route paths.

If the MPP learning data supplementation program 110a, 110b determines that the route path is not found at 210, then the MPP learning data supplementation program 110a, 110b returns to search the nearest link and route path at 208. As such, the MPP learning data supplementation program 110a, 110b may continue to utilize the map version determination module to search the map database until the nearest link or route pattern is retrieved and transmitted to the MPP learning data supplementation program 110a, 110b.

Continuing the previous example, the MPP learning data supplementation program 110a, 110b was unable to find at least one route path to avoid the traffic on Main Street and the changed roads. As such, the MPP learning data supplementation program 110a, 110b continues to search until the nearest road link has been found.

If, however, the MPP learning data supplementation program 110a, 110b determines that the route pattern is found at 210, then the link is set as the virtual Origin (Ov) and another link is set as a virtual Destination (Dv) at 212. The MPP learning data supplementation program 110a, 110b may utilize an Ov/Dv calculation module to determine the Ov and Dv for each vehicle associated with the user driver. The Ov/Dv calculation module may collect trajectory data from a trajectory database associated with a global positioning system (GPS).

When a link is deleted or changed, the Ov/Dv calculation module may determine the Ov by following the one or more links from the changed road in the opposite direction of the destination. When there is one or more shortest routes along which the user driver may reach the link to the traveling direction of the trajectory without making a U-turn, or any other prohibited vehicle maneuvers, the Ov/Dv calculation module may set this point as the Ov.

When a link is newly provided, the Ov/Dv calculation module may set a link connected to the origin of the trajectory in the shortest distance from the newly provided link as a Ov.

Additionally, the Ov/Dv calculation module may determine the Dv by setting a link that allows return to the original trajectories to the direction of the destination. The Ov/Dv calculation module may transmit the calculated Ov and Dv for the user driver to the MPP learning data supplementation program 110a, 110b via the communication network 116.

Continuing the previous example, the MPP learning data supplementation program 110a, 110b determines the Ov at the intersection of Main Street and Broadway Road, and the destination is P.S. 156 in Laurelton, Queens at the intersection of 138$^{th}$ Avenue and Francis Lewis Blvd.

In another embodiment, the MPP learning data supplementation program 110a, 110b may be integrated with a vehicle navigation system, vehicle operation itself, user device (i.e., mobile device), or other embedded system with an application and/or a software program 108 associated with providing navigation and/or travel directions. As such, the MPP learning data supplementation program 110a, 110b may retrieve as an input the Dv and/or Ov associated with the user driver from the integrated system, via the communication network 116.

Then, at 214, the trajectories are collected. The MPP learning data supplementation program 110a, 110b may collect (or extract) the trajectories including the Ov and/or Dv. The MPP learning data supplementation program 110a, 110b may then utilize a route tabulation module to collect (or extract) probable route patterns or a first set of route patterns (i.e., trajectories including the Ov and/or Dv) based on the calculated Ov/Dv. The collected trajectories may also be based on the profile of the individual driver, especially the daily travel patterns and preferences and/or behavior of the driver.

Prior to commencing the MPP learning data supplementation program 110a, 110b, each driver (including additional drivers, similar drivers and user driver) may create an individual profile in which the driver includes the name of the driver, driving preferences (e.g., no toll roads, prefer highway route, prefer side roads, prefer the shortest distance or shortest time), daily driving patterns (e.g., possible route patterns, locations travelled to and/or travelled from on a regular basis) and any data associated with the driver such as past driving behavior or routes (e.g., average speed of driver on highways, destination or origin based on certain times). The driver profile may be stored on a profile database (e.g., database 114) and may be accessed by the MPP learning data supplementation program 110a, 110b.

In at least one embodiment, the MPP learning data supplementation program 110a, 110b may confirm the user driver at the start of the MPP learning data supplementation program 110a, 110b. In some embodiments, when the vehicle has stopped, or the ignition is placed in park, then the MPP learning data supplementation program 110a, 110b may confirm that the user driver has not changed.

In at least one embodiment, the MPP learning data supplementation program 110a, 110b may prompt (e.g., via a dialog box) a new driver to create a profile prior to using the MPP learning data supplementation program 110a, 110b.

Continuing the previous example, based on the Ov/Dv of User Driver A and the previously created driver profile associated with User Driver A (Driver Profile A), the route tabulation module determines that there are three possible route patterns, namely Route Pattern 1, Route Pattern 2, and Route Pattern 3, which include User Driver A's preferences of allowing tolls, preferring highways and preferring the shortest time.

Then, at 216, the MPP learning data supplementation program 110a, 110b determines if the road is removed. The MPP learning data supplementation program 110a, 110b may utilize a trajectory data update module to connect with the GPS associated with the trajectory database to determine whether any of the roads associated with the identified route pattern have been removed (or deleted), or changed from the updated map version. As such, the MPP learning data supplementation program 110a, 110b may perform a finer analysis of the roads associated with the identified route.

If the MPP learning data supplementation program 110a, 110b determines the road is removed at 216, then the route patterns are rerouted at 218. The MPP learning data supplementation program 110a, 110b may utilize the route tabulation module to perform a rerouting calculation based on the new trajectory data of the updated map version. The route tabulation module may, from the Ov, Dv and the current map, obtain a route that may include a set of links, and the route tabulation module may then calculate the route by utilizing an algorithm (e.g., Dijkstra's algorithm, cross-country routing, A* Search algorithm, directed nearest neighbor heuristic, Travelling Salesman Problem (TSP) algorithm, Hub Labelling algorithm, Floyd Warshall's algorithm, Ant Colony Optimization (ACO) algorithms).

Continuing the previous example, for each of the route patterns (Route Patterns 1, 2 and 3), the MPP learning data supplementation program 110a, 110b determines whether any of the roads included in the route pattern have been removed or deleted. The MPP learning data supplementation program 110a, 110b analyzes the route patterns, and determines that two roads on Route Pattern 2 have been removed.

Then, at 220, the MPP learning data supplementation program 110a, 110b determines whether one route is identified. The MPP learning data supplementation program 110a, 110b may utilize the route tabulation module to analyze the rerouting results to determine whether one (i.e., or more than one route) is identified.

If the MPP learning data supplementation program 110a, 110b determines that one route is identified at 220, then the reroute pattern is added to the learning data at 222. The MPP learning data supplementation program 110a, 110b may utilize the trajectory data update module to analyze the identified route (i.e., the second set of route patterns) and determine whether the identified route is new (e.g., not present in the previously used map, or the learning data fails to include any previous data on the route). If the identified route is deemed as new, then the MPP learning data supplementation program 110a, 110b may convert the rerouting result into rerouted learning data. The MPP learning data supplementation program 110a, 110b may then utilize the trajectory data update module to add the reroute pattern to the learning data database. By adding the reroute pattern to the learning data, the MPP learning data supplementation program 110a, 110b may improve the accuracy of the calculation of the MPP for drivers with the same or similar trajectory patterns.

In at least one embodiment, if the road on the trajectory is deleted or changed (e.g., lane is narrowed) and a different trajectory pattern has significantly increased in use by additional drivers when compared to the previous map version, the MPP learning data supplementation program 110a, 110b may add the trajectory pattern of the current map to the learning data.

Continuing the previous example, the MPP learning data supplementation program 110a, 110b determines that instead of Route Pattern 2, the User Driver A can use Route Pattern 2B which substitutes the two removed roads with two other roads. The MPP learning data supplementation program 110a, 110b then analyzes the Route Pattern 2B and determines that Route Pattern 2B includes two new roads.

The trajectory data update module then adds the Route Pattern 2B, with the new roads, into the learning database.

If, however, the MPP learning data supplementation program 110a, 110b determines the road is not removed at 216, then the MPP learning data supplementation program 110a, 110b determines whether the road attributes are changed at 224. The MPP learning data supplementation program 110a, 110b may utilize the trajectory data update module to retrieve any changes to the road attributes from the trajectory database. The road attributes may include any properties associated with the particular road that may affect flow of traffic, or the identification of the road (e.g., road name, road type category, average driving speed, travel direction on the road, potholes, permitted vehicles).

If the MPP learning data supplementation program 110a, 110b determines the road attributes are not changed at 224, then the MPP learning data supplementation program 110a, 110b will determine whether an event exists on any road at 234.

Continuing the previous example, if none of the roads were removed in Route Pattern 2 and the road attributes associated with the roads were unchanged, then the MPP learning data supplementation program 110a, 110b may determine whether there are any events on the roads in the three route patterns.

If the MPP learning data supplementation program 110a, 110b determines the road attributes are changed at 224, the MPP learning data supplementation program 110a, 110b determines one route is not identified at 220, or the reroute pattern is added to the learning data at 222, then the Ov/Dv of the trajectory data for additional drivers is collected at 226. The MPP learning data supplementation program 110a, 110b may analyze the trajectory data associated with additional drivers (e.g., other drivers except the user driver) who have the same Ov/Dv as the user driver, or the Ov/Dv of the additional driver is within close proximity to the Ov/Dv of the user driver.

In at least one embodiment, the MPP learning data supplementation program 110a, 110b may receive consent, via an opt-in or opt-out feature, of each corresponding additional driver prior to commencing the trajectory data collection and/or monitoring by the MPP learning data supplementation program 110a, 110b. In some embodiments, the MPP learning data supplementation program 110a, 110b may notify (e.g., via dialog box) the additional driver when the data collection begins.

In at least one embodiment, the MPP learning data supplementation program 110a, 110b may determine that close proximity may be based on a previously determined distance (e.g., within a one-mile radius) of the Ov and/or the Dv. In some embodiments, an administrator may re-configure the settings to change the distance which may be considered close proximity.

Continuing the previous example, the MPP learning data supplementation program 110a, 110b determines that the road attributes for Route Pattern 2B have changed since the speed limit has been reduced to 15 miles per hour (opposed to 30 miles per hour) due to the opening of a new school on two new roads on Route Pattern 2B. As such, the MPP learning data supplementation program 110a, 110b collects trajectory data associated with 20 additional drivers who have the same or similar Ov/Dv (within a one-mile radius) as the Ov/Dv of User Driver A.

Then, at 228, the frequencies of the route patterns per Ov/Dv are collected. The MPP learning data supplementation program 110a, 110b may generate the frequencies (i.e., rate at which each route pattern is represented by an additional driver over a particular period of time or in the given sample) of the route patterns with minor variations to the second set of route patterns based on the collected Ov/Dv associated with the additional drivers (i.e., third set of route patterns). The frequency analysis may be performed on each route pattern associated with each additional driver with a similar or same Ov/Dv. The MPP learning data supplementation program 110a, 110b may then depict the frequencies in a frequency distribution table that summarizes the distribution of values generated by the trajectory collected by the additional drivers.

In at least one embodiment, the third set of route patterns may include route patterns in which removed roads or roads with at least one change in road attributes are substituted for new or different roads that were previously included in the particular route pattern. As such, the third set of route patterns may include minor variations to the second set of route patterns in light of the data collected by the additional drivers.

In at least one embodiment, the MPP learning data supplementation program 110a, 110b may utilize a histogram to tabulate the frequencies in which the histogram may be normalized to display relative frequencies, or the histogram may include discrete intervals with an area proportional to the frequency of the observations in the interval. In some embodiments, the MPP learning data supplementation program 110a, 110b may utilize one or more bar graphs in which the lengths of each bar is proportional to the values represented.

Continuing the previous example, the MPP learning data supplementation program 110a, 110b calculates the frequencies of Route Patterns 1, 2B and 3 as shown in the following Table 1 after the update (i.e., based on the current map):

TABLE 1

| After Update | |
|---|---|
| | Frequency |
| Route Pattern 1 | 5 |
| Route Pattern 2B | 2 |
| Route Pattern 3 | 0 |

The MPP learning data supplementation program 110a, 110b then compares the calculated frequencies of Route Patterns 1, 2B and 3 based on the current map with the frequencies of Route Patterns 1, 2B and 3 based on the previously used map as shown in the following Table 2 before the update:

TABLE 2

| Before Update | |
|---|---|
| | Frequency |
| Route Pattern 1 | 0 |
| Route Pattern 2B | 2 |
| Route Pattern 3 | 6 |

Then, at 230, the MPP learning data supplementation program 110a, 110b determines whether the frequencies have increased. The MPP learning data supplementation program 110a, 110b may determine the frequencies of the route patterns based on the collected Ov/Dv and determine whether a route pattern increased in frequency among the route patterns after the map change to the learning data. To determine whether a pattern increased, the MPP learning data supplementation program 110a, 110b may have to analyze a large quantity of learning data over a period of time.

If the MPP learning data supplementation program 110a, 110b determines the frequencies have increased at 230, then the additional reroute pattern is added to learning data at 232. The MPP learning data supplementation program 110a, 110b may utilize the trajectory data update module to add the additional reroute pattern to learning data in the learning data database. By adding the additional reroute pattern to the learning data, the MPP learning data supplementation program 110a, 110b may have greater accuracy, when determining the MPP from current trajectory patterns and past statistics.

Continuing the previous example, based on the above Tables 1 and 2, the MPP learning data supplementation program 110a, 110b determines that the Route Pattern 1 increased from 0 to 5 frequencies. Therefore, the trajectory data update module adds Route Pattern 1 to the learning data in the learning data database.

If, however, the MPP learning data supplementation program 110a, 110b determines the frequencies have not increased (i.e., decreased or remains the same) at 230, or after the additional reroute patterns are added to the learning data at 232, then the MPP learning data supplementation program 110a, 110b will determine whether an event exists on any road associated with the reroute patterns at 234.

Continuing the previous example, based on the above Tables 1 and 2, the MPP learning data supplementation program 110a, 110b determines that the Route Pattern 2B remained the same at 2 before and after the update, and Route Pattern 3 has decreased from 6 to 0. The MPP learning data supplementation program 110a, 110b then proceeds to determine whether an event exists on any road associated with Route Patterns 1, 2B or 3.

Then, at 234, the MPP learning data supplementation program 110a, 110b determines whether an event exists on any road. The MPP learning data supplementation program 110a, 110b may utilize an event trajectory determination module to retrieve any events associated with a road from an events database. The events on the road may include an obstruction, construction, an incident (e.g., stopped vehicle, emergency vehicles, police hidden or visible on the road), a parade or protest, an accident, or any other occurrence that may affect the flow of traffic on the road.

If the MPP learning data supplementation program 110a, 110b determines that an event exists on the road at 234, then the MPP learning data supplementation program 110a, 110b determines whether enough of a trajectory exists at 236. The MPP learning data supplementation program 110a, 110b may determine that the event on the road fails to significantly affect the traffic pattern (or projected driving time) of the user driver. To determine whether the event may significantly affect or change the traffic pattern of the user driver, the MPP learning data supplementation program 110a, 110b may include a threshold level of affect or change caused by the event on the road, for example, if the event may slow down the speed of the user driver (e.g., equal to or less than half of the posted speed limit), or may add a certain amount of delay in the driving time of the user driver (e.g., adding more than approximately five minutes to the user's driving time). If the event fails to exceed or equal the threshold level, then the MPP learning data supplementation program 110a, 110b may determine there is enough trajectory on the road.

In at least one embodiment, the MPP learning data supplementation program 110a, 110b may analyze whether the event has an end or start time, and whether the travel time of the user driver may be before the end time, or after the start time (e.g., if the event is scheduled road repair for one week from 11 pm to 5 am) by projecting the estimated time that the user driver may reach that road, based on the daily driving patterns of the user driver, or based on the Ov/Dv of the user driver. The MPP learning data supplementation program 110a, 110b may then determine if the user driver may be traveling on the road with the event when the event is occurring. If not, then the MPP learning data supplementation program 110a, 110b may determine that there is enough trajectory on the road.

In at least one embodiment, in addition to the events database, the event trajectory determination module may utilize a search engine to search for data associated with any events on a road and/or route pattern from local agencies or departments websites associated with the construction and/or maintenance of the roads in a particular geographical region or area. The event trajectory determination module may then further utilize a natural language processing (NLP) parser to parse through the websites to identify keywords and/or content associated with the type of work (e.g., construction, repair, closures), a particular road or route (e.g., Main Street), and/or a particular region (e.g., southeast Queens), and may determine whether the information is associated with an event. Then, an extraction engine may be utilized to extract the applicable data associated with any events on a road or route from local agencies or departments websites. For example, since the Department of Highways and Roads periodically posts or publishes information, such as location, duration and time, for any upcoming or ongoing construction or road work, on the website, the event trajectory determination module will retrieve such information from the website.

In the some embodiments, the event trajectory determination module may retrieve data associated with events on the road from social media posts in which a person or agency may post information associated with events on the road by utilizing the search engine, NLP parser and extraction engine.

Continuing the previous example, the event trajectory determination module obtains data from various agency websites to determine that there are a total of five events on the roads associated with Route Patterns 2B and 1. As such, the event trajectory determination module determines that the two events associated with Route Pattern 2B start at midnight and end at 5 am. Therefore, these two events will not affect User Driver A who traveling during the evening rush hour around 5 pm to 6 pm. The event trajectory determination module then accesses social media posts to determine that the three events associated with Route Pattern 1 are occurring now during User Driver A's commute to the Parent Teacher conference at Child A's school.

If the MPP learning data supplementation program 110a, 110b determines that enough of a trajectory exists at 236, then weight is added at 238. The MPP learning data supplementation program 110a, 110b may then weigh the route pattern associated with the road with the event to increase, decrease, or have no change on (i.e., remain the same) the probability of that route by adding or multiplying a constant of weighting factor(s) to the probability of the route pattern. The MPP learning data supplementation program 110a, 110b may then reduce the confidence of the route patterns adopted only when the event occurs. The MPP learning data supplementation program 110a, 110b may reduce the confidence of the route patterns (including the remaining first set of route patterns, first set of route patterns, second set of route patterns and third set of route patterns) that include the road with the event, or may delete the route pattern that includes the road with the event from the trajectory pattern result.

Continuing the previous example, if the MPP learning data supplementation program 110a, 110b determines that regardless of the five events (two events occurring on Route Pattern 2B and three events occurring on Route Pattern 1) there is no significant affect or change on the traffic patterns, namely that the User Driver A's speed would not reduce to half or less than half of the posted speed limit and the event will not add more than five minutes to User Driver A's travel time, then the MPP learning data supplementation program 110a, 110b may determine that enough of a trajectory exists on Route Patterns 1 and 2B. As such, the MPP learning data supplementation program 110a, 110b may, based on the events, add weight to each of the route patterns. Since the two events occurring on Route Pattern 2B include construction at two different points, which starts at midnight and ends at 5 am, the MPP learning data supplementation program 110a, 110b places less weight on these events since the events do not affect User Driver A's travel time between 5 pm and 6 pm. Additionally, since Route Pattern 1 includes three different events, namely a stopped vehicle and two visible police vehicles to detect drivers who are speeding, the MPP learning data supplementation program 110a, 110b places more weight on the two events associated with the visible police vehicles based on a noticeable decrease in speed in close proximity to each visible police vehicle. The weight added onto Route Pattern 1 reduces the confidence associated with the MPP learning data supplementation program 110a, 110b as related to Route Pattern 1 and that fact that Route Pattern 1 would not affect or change User Driver A's travel time and speed.

If, however, the MPP learning data supplementation program 110a, 110b determines that enough of a trajectory does not exist at 236, then the trajectories of the additional drivers and frequencies of route patterns are collected at 240. If the MPP learning data supplementation program 110a, 110b determines that the event significantly affects the traffic pattern of the user driver (e.g., the user's speed would decrease to more than half the posted speed, or the delay in driving time is more than five minutes), then the MPP learning data supplementation program 110a, 110b determines that there is not enough trajectory on the road. As such, the MPP learning data supplementation program 110a, 110b may collect trajectory data associated with additional drivers to identify alternative route patterns (i.e., a fourth set of route patterns) for the user driver.

In at least one embodiment, the MPP learning data supplementation program 110a, 110b may utilize the collected data associated with additional drivers to provide minor substitutions to the roads associated with a route pattern included in the third set of route patterns and to provide different and/or alternate route patterns included in the fourth set of route patterns that differ from the previously identified first, second and third set of route patterns.

In at least one embodiment, the MPP learning data supplementation program 110a, 110b may receive consent, via an opt-in or opt-out feature, of each corresponding additional driver prior to commencing the trajectory data collection and/or monitoring by the MPP learning data supplementation program 110a, 110b. In some embodiments, the MPP learning data supplementation program 110a, 110b may notify (e.g., via dialog box) the additional driver when the data collection begins.

Additionally, the MPP learning data supplementation program 110a, 110b may calculate the frequencies (i.e., rate at which each route pattern is represented by an additional driver over a particular period of time or in the given sample) of each route pattern for the identified alternative route patterns (i.e., a fourth set of route patterns). The frequency analysis may be performed on each of the identified route patterns associated with each additional driver. The MPP learning data supplementation program 110a, 110b may then depict the frequencies in a frequency distribution table that summarizes the distribution of values generated by the trajectory collected by the additional drivers.

In at least one embodiment, the MPP learning data supplementation program 110a, 110b may utilize a histogram to tabulate the frequencies in which the histogram may be normalized to display relative frequencies, or the histogram may include discrete intervals with an area proportional to the frequency of the observations in the interval. In some embodiments, the MPP learning data supplementation program 110a, 110b may utilize one or more bar graphs in which the lengths of each bar is proportional to the values represented.

Continuing the previous example, the MPP learning data supplementation program 110a, 110b determines that there is not enough trajectory on the roads, with the three events, for Route Pattern 1 based on the determination that the average speed on the roads with the three events decreased from 30 miles per hour to 10 miles per hour. This decrease is less than half the speed limit on each of the roads with the three events on Route Pattern 1. The MPP learning data supplementation program 110a, 110b then collected data associated with 20 additional drivers with the same Ov/Dv, or the Ov/Dv associated with each additional driver is within a one-mile radius of the Ov/Dv associated with User Driver A. Based on the additional drivers, the MPP learning data supplementation program 110a, 110b identifies three more route patterns, namely Route Pattern 4, 5 and 6, and calculates the additional frequencies for these additional route patterns after the update as shown in the following Table 3:

TABLE 3

After Update

| | Frequency |
|---|---|
| Route Pattern 4 | 12 |
| Route Pattern 5 | 4 |
| Route Pattern 6 | 4 |

Then, at 242, the MPP learning data supplementation program 110a, 110b determines whether additional frequencies have increased. The MPP learning data supplementation program 110a, 110b may then compare the additional frequencies for each identified route pattern by the additional drivers to determine whether the frequencies for each have increased, decreased, or remain the same (e.g., whether more drivers have taken one route pattern over another). To determine whether the frequencies have increased, decreased or remain the same, the MPP learning data supplementation program 110a, 110b may compare the frequencies for the identified route pattern before and/or after the event has occurred. If the identified route pattern(s) have increased in frequency during the time that the event occurs as compared to before and/or after the event has occurred (e.g., when the event ends or before the event starts), then the MPP learning data supplementation program 110a, 110b may determine that the frequency corresponding with that identified route pattern has increased.

If the MPP learning data supplementation program 110a, 110b determines that additional frequencies have increased at 242, then similar drivers are identified at 244. The MPP learning data supplementation program 110a, 110b may analyze the driving behavior and/or preferences from the driver profiles associated with each additional driver by comparing the driving preferences and/or behavior of the additional drivers and the user driver to identify similar drivers (e.g., additional drivers with similar driving preferences and/or behaviors as the user driver). The MPP learning data supplementation program 110a, 110b may utilize a natural language processing (NLP) parser, which may parse through the driver profiles. The MPP learning data supplementation program 110a, 110b may utilize NLP techniques to identify keywords and/or extract content from the information included in the driver profiles. The MPP learning data supplementation program 110a, 110b may then identify any similarities in driving preferences and/or behaviors between any of the additional drivers and the user driver. Any additional drivers with identified similarities in driving preferences and/or behaviors may be identified by the MPP learning data supplementation program 110a, 110b.

Continuing the previous example, the MPP learning data supplementation program 110a, 110b then compares these additional frequencies for the additional route patterns with the frequencies of the same route patterns before the update as shown in the following Table 4:

TABLE 4

| Before Update | |
|---|---|
| | Frequency |
| Route Pattern 4 | 10 |
| Route Pattern 5 | 3 |
| Route Pattern 6 | 7 |

By comparing Tables 3 and 4, the MPP learning data supplementation program 110a, 110b determines that Route Pattern 4 increases in frequency from 10 to 12, and Route Pattern 5 increases from 3 to 4. Therefore, the MPP learning data supplementation program 110a, 110b utilizes a NLP parser to search the driver profile associated with each additional driver to identify similar drivers. The NLP parser identified driver profiles that include at least one of the same driver preferences, namely avoiding toll roads, prefers highways and prefers the shortest time. As such, the MPP learning data supplementation program 110a, 110b identifies four similar drivers.

Then, at 246, the route patterns are filtered. The MPP learning data supplementation program 110a, 110b may then filter the route patterns from a remaining set of route patterns based on the first set of route patterns, second set of route patterns and the third set of route patterns, and the fourth set of route patterns to include the route patterns utilized by the similar drivers. The preferences for which factors may be utilized to filter the route patterns may be included in a set of configurations. A simple algorithm may count the same configurations among the similar drivers, and may filter the similar drivers by utilizing a threshold. The fifth set of route patterns (i.e., a final set of route patterns) may include the MPP for the user driver.

In at least one embodiment, the MPP learning data supplementation program 110a, 110b may rank the similar drivers based on how many similarities are included in the corresponding similar driver profiles in relation to the user driver profile. For example, the most similar driver profile includes five instances of similar content with the user driver, as opposed to the least similar driver profile with one instance of similar content with the user driver. The MPP learning data supplementation program 110a, 110b may then filter the route patterns to include the route patterns associated with a certain quantity of most similar additional drivers. For example, the MPP learning data supplementation program 110a, 110b can remove all the route patterns, except the route patterns associated with additional drivers with three or more instances of similarity to the user driver.

Continuing the previous example, the MPP learning data supplementation program 110a, 110b then filters the route patterns to include only route patterns with the similar drivers. As such, Route Patterns 1, 2B, 5 and 6 are eliminated, since none of these route patterns include any of the four similar drivers.

Then, at 248, route patterns are added to the learning data. The MPP learning data supplementation program 110a, 110b may utilize the trajectory data update module to add the route patterns associated with the similar drivers to learning data in the learning data database. By adding the route patterns associated with the similar drivers to the learning data, the MPP learning data supplementation program 110a, 110b may have greater accuracy, when determining the MPP from current trajectory patterns and past statistics.

Continuing the previous example, the trajectory data update module then adds Route Patterns 3 and 4 to the learning data in the learning data database, since Route Patterns 3 and 4 were the only identified route patterns with similar drivers.

If, however, the MPP learning data supplementation program 110a, 110b determines that additional frequencies have not increased (i.e., decreased or remain the same) at 242, the MPP learning data supplementation program 110a, 110b determines that an event does not exist on the road at 234, after the route patterns are added to the learning data at 248, or after weight is added at 238, then trajectory patterns are analyzed at 250. The MPP learning data supplementation program 110a, 110b may then utilize a route clustering module to analyze the trajectory patterns. By using the collected data associated with the route patterns and frequencies associated with the additional drivers, the route patterns associated with similar drivers, route patterns during the existence of an event, and the route patterns when there is no increase in frequency, the route clustering module may utilize a trajectory mining system to focus on the small subset of trajectory points associated with the collected data by generating a trajectory heat map to capture the aggregated trajectory patterns. The route clustering module may then utilize the generated trajectory heat map and spatio-temporal analytics of the trajectory patterns from the generated trajectory heat map to determine the Most Probable Path (MPP).

Continuing the previous example, since Route Patterns 3 and 6 decreased and Route Pattern 2B remained the same, the MPP learning data supplementation program 110a, 110b, utilizing the route clustering module, analyzes the trajectory patterns associated with these route patterns to determine that the MPP for the User Driver A from the intersection of Main Street and Broadway Road (Ov), and P.S. 156 in Laurelton, Queens at the intersection of $138^{th}$ Avenue and Francis Lewis Blvd (Dv) between the times of 5:07 pm and 6:15 pm is Route Pattern 2B.

The functionality of a computer may be improved by the MPP learning data supplementation program 110a, 110b because the MPP learning data supplementation program 110a, 110b may determine the MPP from current trajectory data and past statistics by supplementing the learning data with changed trajectory patterns and rerouting results from an updated map. The MPP learning data supplementation program 110a, 110b may further to perform rerouting calculations with new trajectory data on the updated (i.e., current) map, calculate rerouting results to learning data, and add trajectory patterns to learning data based on the increasing rerouting results.

It may be appreciated that FIGS. 2A, 2B and 2C provide only an illustration of one embodiment and do not imply any limitations with regard to how different embodiments may be implemented. Many modifications to the depicted embodiment(s) may be made based on design and implementation requirements.

Figure 3:
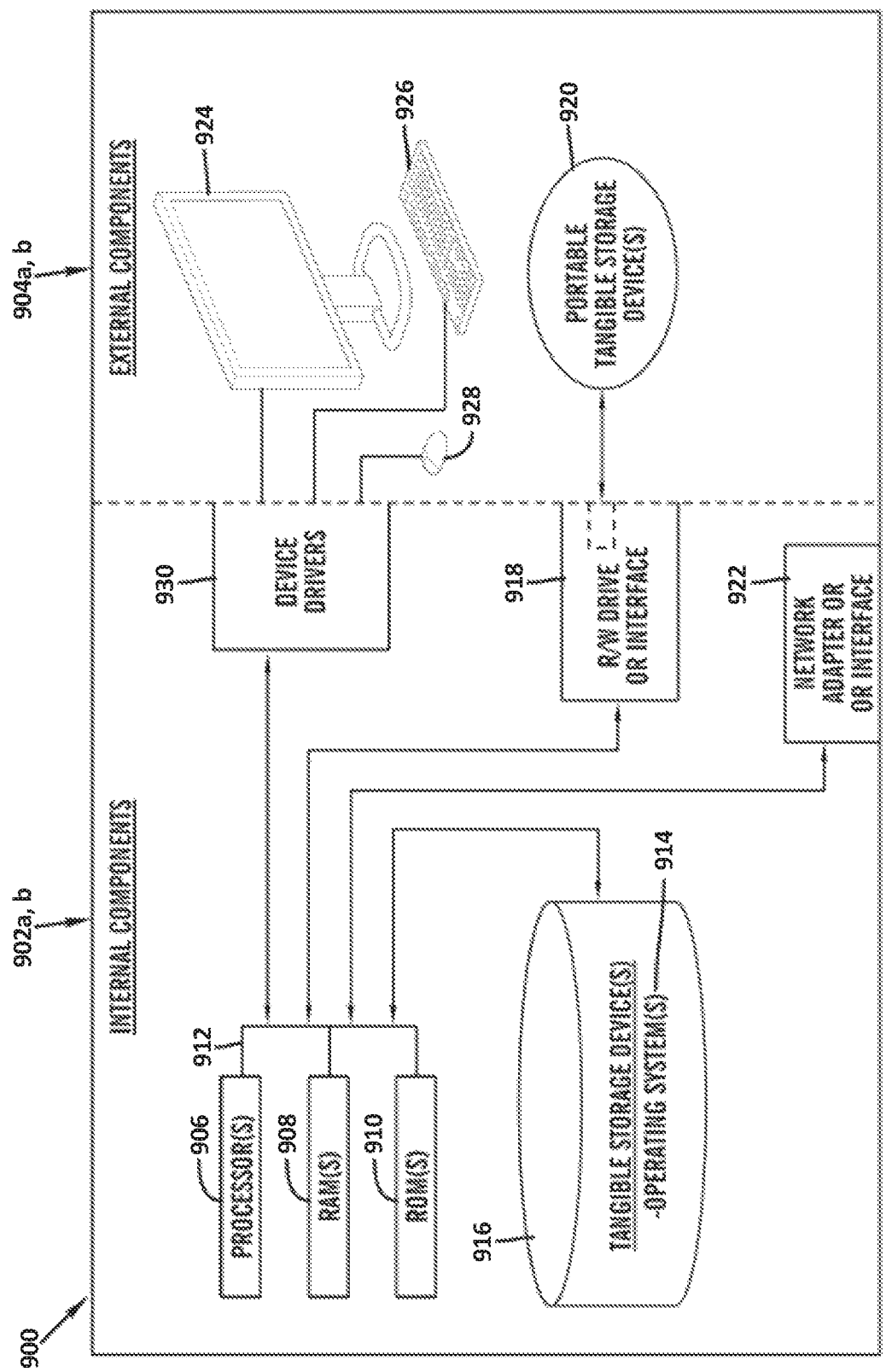
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the MPP learning data supplementation program 110a in client computer 102, and the MPP learning data supplementation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the MPP learning data supplementation program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the MPP learning data supplementation program 110a in client computer 102 and the MPP learning data supplementation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the MPP learning data supplementation program 110a in client computer 102 and the MPP learning data supplementation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
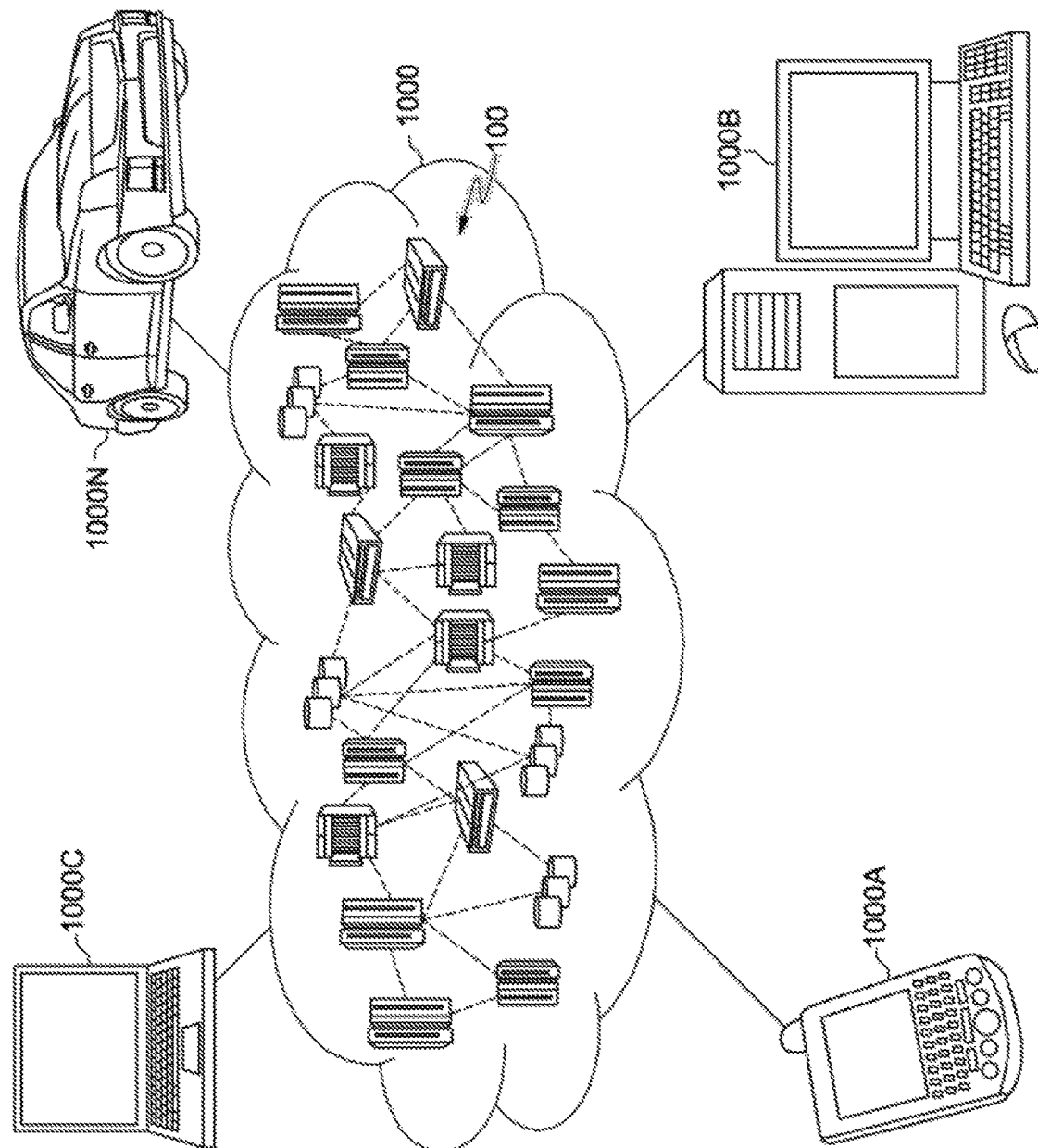
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
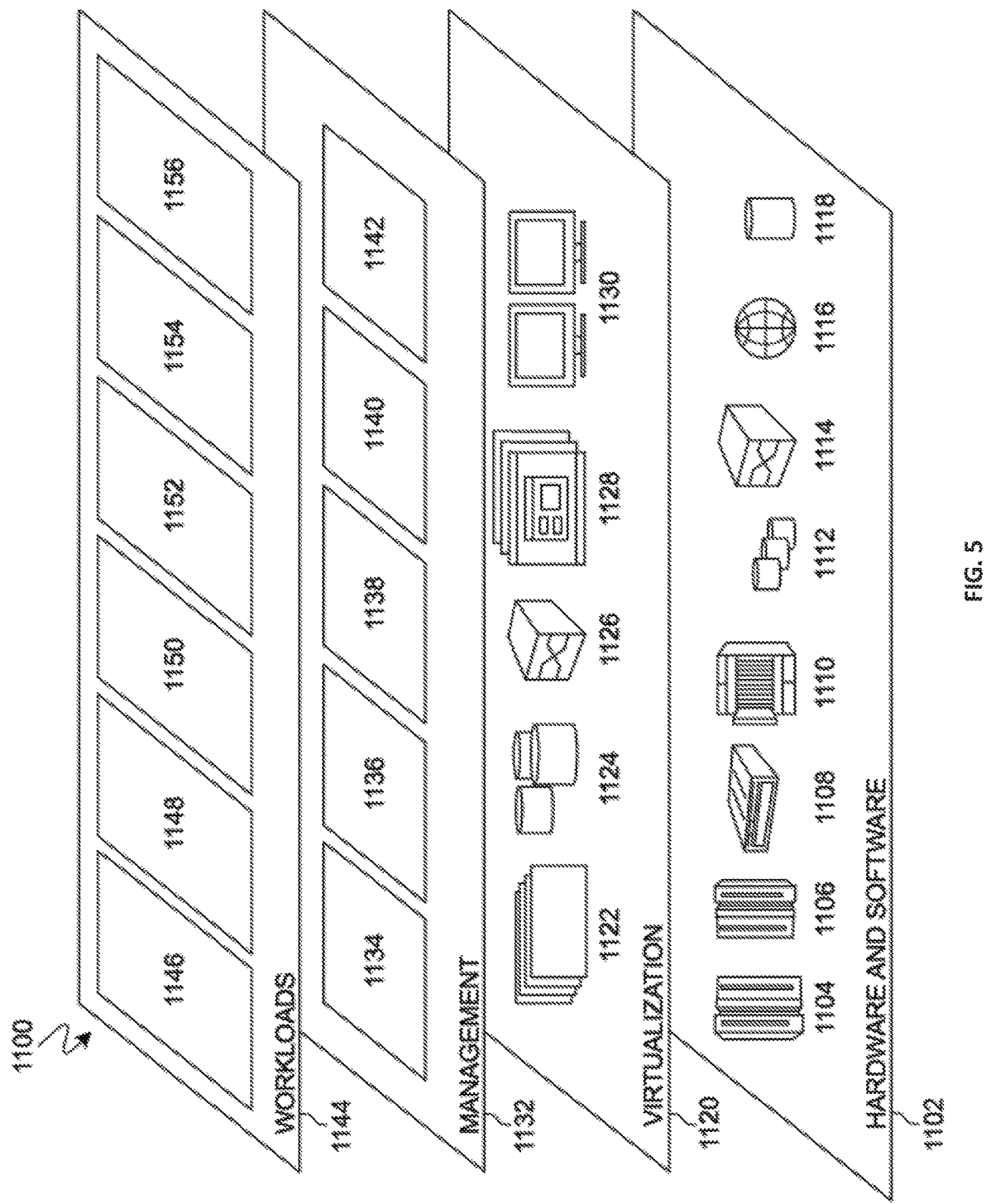
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and MPP learning data supplementation 1156. A MPP learning data supplementation program 110a, 110b provides a way to supplement learning data for MPP.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently and/or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for supplementing learning data in a learning data database to determine a most probable path for a user driver, the computer-implemented method comprising:
   determining a change associated with a set of map data;
   determining a first route pattern is present, the first route pattern comprising one or more links;
   setting one of the one or more links as a virtual origin associated with the user driver;
   setting another one of the one or more links as a virtual destination associated with the user driver;
   in response to the determined change associated with the set of map data, extracting a set of trajectory data associated with the first route pattern based on the virtual origin and the virtual destination associated with the user driver;
   determining one or more roads associated with the first route pattern were removed based on the extracted set of trajectory data;
   determining a second set of route patterns by rerouting the first route pattern in response to the determination that the one or more roads associated with the first route pattern were removed;
   in response to failing to determine the second set of route patterns by rerouting the first route pattern, collecting a virtual origin and a virtual destination associated with a set of additional trajectory data associated with one or more additional drivers,
      wherein the one or more additional drivers include a same virtual origin as the user driver or a similar virtual origin as the user driver,
      wherein the one or more additional drivers include a same virtual destination as the user driver or a similar virtual destination as the user driver,
   collecting a frequency of a third set of route patterns based on the virtual origin and the virtual destination associated with the set of additional trajectory data associated with the one or more additional drivers;
   comparing a frequency of the third set of route patterns after the determined change in the set of map data with a frequency of the third set of route patterns before the determined change in the set of map data; and
   in response to determining the frequency of the third set of route patterns after the determined change in the set of map data increased from the frequency of the third set of route patterns before the determined change in the set of map data, adding the third set of route patterns to the learning data in the learning data database.

2. The method of claim 1, wherein extracting the set of trajectory data in response to the determined change associated with the set of map data, comprises:
   extracting an added or a deleted road; and
   extracting a trajectory passing through a changed road.

3. The method of claim 1, further comprising:
   adding the second set of route patterns to the learning data in the learning data database,
      wherein the added second set of route patterns were absent before the determined change associated with the set of map data.

4. The method of claim 1, further comprising:
   determining an event exists on one or more roads associated with a remaining set of route patterns associated with the first route pattern, the second set of route patterns and the third set of route patterns;
   in response to determining the event exists, determining enough trajectory exists on the one or more roads associated with the remaining set of route patterns associated with the first route pattern, the second set of route patterns and the third set of route patterns; and
   adding a set of weights to route patterns determined to having events on them.

5. The method of claim 1, further comprising:
   determining an event exists on one or more roads associated with a remaining set of route patterns associated with the first route pattern, the second set of route patterns and the third set of route patterns;
   in response to determining the event exists, determining a lack of trajectory exists on the one or more roads;
   collecting the set of additional trajectory data associated with the one or more additional drivers;
   collecting one or more additional frequencies associated with a fourth set of route patterns based on the collected set of additional trajectory data associated with the one or more additional drivers,
      wherein the collected one or more additional frequencies based on the collected set of additional trajectory data associated with the one or more additional drivers includes a first additional frequency associated with the fourth set of route patterns before the determined change to the set of map data, and a second additional frequency associated with the fourth set of route patterns after the determined change to the set of map data; and comparing the first additional frequency associated with the fourth set of route patterns with the second additional frequency associated with the fourth set of route patterns.

6. The method of claim 5, further comprising:

collecting a plurality of trajectory patterns associated with one or more similar drivers,
- wherein the one or more similar drivers each comprise one or more common driving preferences to the user driver, or one or more common driving behaviors to the user driver;

filtering the remaining set of route patterns based on the first route pattern, the second set of route patterns and the third set of route patterns, and the fourth set of route patterns to include route patterns utilized by the one or more similar drivers,
- wherein the filtered remaining set of route patterns and the fourth set of route patterns generates a final set of route patterns; and adding the generated final set of route patterns to the learning data in the learning data database.

7. The method of claim 1, wherein the similar virtual origin of the one or more additional drivers is within a previously determined proximity to the virtual origin of the user driver, and wherein the similar virtual destination is within the previously determined proximity to the virtual destination of the user driver.

8. A computer system for supplementing learning data in a learning data database to determine a most probable path for a user driver, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more memories, wherein the computer system is capable of performing a method comprising:

determining a change associated with a set of map data;

determining a first route pattern is present, the first route pattern comprising one or more links;

setting one of the one or more links as a virtual origin associated with the user driver;

setting another one of the one or more links as a virtual destination associated with the user driver;

in response to the determined change associated with the set of map data, extracting a set of trajectory data associated with the first route pattern based on the virtual origin and the virtual destination associated with the user driver;

determining one or more roads associated with the first route pattern were removed based on the extracted set of trajectory data;

determining a second set of route patterns by rerouting the first route pattern in response to the determination that the one or more roads associated with the first route pattern were removed;

in response to failing to determine the second set of route patterns by rerouting the first route pattern, collecting a virtual origin and a virtual destination associated with a set of additional trajectory data associated with one or more additional drivers,
- wherein the one or more additional drivers include a same virtual origin as the user driver or a similar virtual origin as the user driver,
- wherein the one or more additional drivers include a same virtual destination as the user driver or a similar virtual destination as the user driver, collecting a frequency of a third set of route patterns based on the virtual origin and the virtual destination associated with the set of additional trajectory data associated with the one or more additional drivers;

comparing a frequency of the third set of route patterns after the determined change in the set of map data with a frequency of the third set of route patterns before the determined change in the set of map data; and in response to determining the frequency of the third set of route patterns after the determined change in the set of map data increased from the frequency of the third set of route patterns before the determined change in the set of map data, adding the third set of route patterns to the learning data in the learning data database.

9. The computer system of claim 8, wherein extracting the set of trajectory data in response to the determined change associated with the set of map data, comprises:

extracting an added or a deleted road; and extracting a trajectory passing through a changed road.

10. The computer system of claim 8, further comprising:

adding the second set of route patterns to the learning data in the learning data database,
- wherein the added second set of route patterns were absent before the determined change associated with the set of map data.

11. The computer system of claim 8, further comprising:

determining an event exists on one or more roads associated with a remaining set of route patterns associated with the first route pattern, the second set of route patterns and the third set of route patterns;

in response to determining the event exists, determining enough trajectory exists on the one or more roads associated with the remaining set of route patterns associated with the first route pattern, the second set of route patterns and the third set of route patterns; and adding a set of weights to route patterns determined to having events on them.

12. The computer system of claim 8, further comprising:

determining an event exists on one or more roads associated with a remaining set of route patterns associated with the first route pattern, the second set of route patterns and the third set of route patterns;

in response to determining the event exists, determining a lack of trajectory exists on the one or more roads;

collecting the set of additional trajectory data associated with the one or more additional drivers;

collecting one or more additional frequencies associated with a fourth set of route patterns based on the collected set of additional trajectory data associated with the one or more additional drivers,
- wherein the collected one or more additional frequencies based on the collected set of additional trajectory data associated with the one or more additional drivers includes a first additional frequency associated with the fourth set of route patterns before the determined change to the set of map data, and a second additional frequency associated with the fourth set of route patterns after the determined change to the set of map data; and comparing the first additional frequency associated with the fourth set of route patterns with the second additional frequency associated with the fourth set of route patterns.

13. The computer system of claim 12, further comprising:
collecting a plurality of trajectory patterns associated with one or more similar drivers,
wherein the one or more similar drivers each comprise one or more common driving preferences to the user driver, or one or more common driving behaviors to the user driver;
filtering the remaining set of route patterns based on the first route pattern, the second set of route patterns and the third set of route patterns, and the fourth set of route patterns to include route patterns utilized by the one or more similar drivers,
wherein the filtered remaining set of route patterns and the fourth set of route patterns generates a final set of route patterns; and
adding the generated final set of route patterns to the learning data in the learning data database.

14. The computer system of claim 8, wherein the similar virtual origin of the one or more additional drivers is within a previously determined proximity to the virtual origin of the user driver, and wherein the similar virtual destination is within the previously determined proximity to the virtual destination of the user driver.

15. A computer program product for supplementing learning data in a learning data database to determine a most probable path for a user driver, the computer program product comprising a computer readable storage medium having program instructions embodied therewith, the program instructions executable by a processor to:
determining a change associated with a set of map data;
determining a first route pattern is present, the first route pattern comprising one or more links;
setting one of the one or more links as a virtual origin associated with the user driver;
setting another one of the one or more links as a virtual destination associated with the user driver;
in response to the determined change associated with the set of map data, extracting a set of trajectory data associated with the first route pattern based on the virtual origin and the virtual destination associated with the user driver;
determining one or more roads associated with the first route pattern were removed based on the extracted set of trajectory data;
determining a second set of route patterns by rerouting the first route pattern in response to the determination that the one or more roads associated with the first route pattern were removed;
in response to failing to determine the second set of route patterns by rerouting the first route pattern, collecting a virtual origin and a virtual destination associated with a set of additional trajectory data associated with one or more additional drivers,
wherein the one or more additional drivers include a same virtual origin as the user driver or a similar virtual origin as the user driver,
wherein the one or more additional drivers include a same virtual destination as the user driver or a similar virtual destination as the user driver,
collecting a frequency of a third set of route patterns based on the virtual origin and the virtual destination associated with the set of additional trajectory data associated with the one or more additional drivers;
comparing a frequency of the third set of route patterns after the determined change in the set of map data with a frequency of the third set of route patterns before the determined change in the set of map data; and
in response to determining the frequency of the third set of route patterns after the determined change in the set of map data increased from the frequency of the third set of route patterns before the determined change in the set of map data, adding the third set of route patterns to the learning data in the learning data database.

16. The computer program product of claim 15, wherein extracting the set of trajectory data in response to the determined change associated with the set of map data, comprises:
extracting an added or a deleted road; and
extracting a trajectory passing through a changed road.

17. The computer program product of claim 15, further comprising:
adding the second set of route patterns to the learning data in the learning data database,
wherein the added second set of route patterns were absent before the determined change associated with the set of map data.

18. The computer program product of claim 15, further comprising:
determining an event exists on one or more roads associated with a remaining set of route patterns associated with the first route pattern, the second set of route patterns and the third set of route patterns;
in response to determining the event exists, determining enough trajectory exists on the one or more roads associated with the remaining set of route patterns associated with the first route pattern, the second set of route patterns and the third set of route patterns; and
adding a set of weights to route patterns determined to having events on them.

19. The computer program product of claim 15, further comprising:
determining an event exists on one or more roads associated with a remaining set of route patterns associated with the first route pattern, the second set of route patterns and the third set of route patterns;
in response to determining the event exists, determining a lack of trajectory exists on the one or more roads;
collecting the set of additional trajectory data associated with the one or more additional drivers;
collecting one or more additional frequencies associated with a fourth set of route patterns based on the collected set of additional trajectory data associated with the one or more additional drivers,
wherein the collected one or more additional frequencies based on the collected set of additional trajectory data associated with the one or more additional drivers includes a first additional frequency associated with the fourth set of route patterns before the determined change to the set of map data, and a second additional frequency associated with the fourth set of route patterns after the determined change to the set of map data; and
comparing the first additional frequency associated with the fourth set of route patterns with the second additional frequency associated with the fourth set of route patterns.

20. The computer program product of claim 19, further comprising:
collecting a plurality of trajectory patterns associated with one or more similar drivers,
wherein the one or more similar drivers each comprise one or more common driving preferences to the user driver, or one or more common driving behaviors to the user driver;

filtering the remaining set of route patterns based on the first route pattern, the second set of route patterns and the third set of route patterns, and the fourth set of route patterns to include route patterns utilized by the one or more similar drivers,
  wherein the filtered remaining set of route patterns and the fourth set of route patterns generates a final set of route patterns; and
adding the generated final set of route patterns to the learning data in the learning data database.

\* \* \* \* \*